United States Patent [19]

Onda

[11] Patent Number: 5,358,200
[45] Date of Patent: Oct. 25, 1994

[54] AIRSHIP

[75] Inventor: Masahiko Onda, Tsukuba, Japan

[73] Assignees: Agency of Industrial Science & Technology; Minstry of International Trade & Industry, Tokyo, Japan

[21] Appl. No.: 109,256

[22] Filed: Aug. 20, 1993

[30] Foreign Application Priority Data

Aug. 21, 1992 [JP] Japan .................................. 4-245671

[51] Int. Cl.$^5$ .................................................. B64B 1/10
[52] U.S. Cl. ........................................ 244/96; 244/30; 244/29
[58] Field of Search ............... 244/96, 30, 29, 117 R, 244/119, 49

[56] References Cited

FOREIGN PATENT DOCUMENTS

| | | | |
|---|---|---|---|
| 382794 | 12/1909 | France | ............................ 244/30 |
| 1181456 | 6/1959 | France | ............................ 244/96 |

*Primary Examiner*—Michael S. Huppert
*Assistant Examiner*—Anne E. Bidwell

*Attorney, Agent, or Firm*—Oblon, Spivak, McClelland, Maier & Neustadt

[57] ABSTRACT

An airship includes a gas envelope filled with a buoyant gas, a duct equipped with an internal propulsion fan and attached to the aft of the gas bag, a boom projecting aft along an extension of the axis of the propulsion fan and an empennage provided on the distal end of the boom and is constituted to prevent boundary layer separation by causing the propulsion fan to suck air flowing along the hull surface into the duct and jet it aft. The duct attached to the aft of the gas bag is formed of a basket-like framework made of rigid light-weight material and covered with taut fabric material, the boom and empennage are formed of airtight fabric material and rigidified by internal pressures, and the internal pressure of the boom and the empennage are regulated so that when load forces received from the empennage side exceed prescribed values above which some part of the airship is liable to be damaged, the boom bends and/or the empennage deforms to relieve the load forces before the damage occurs and the original shape and rigidity is thereafter restored.

1 Claim, 2 Drawing Sheets

AIRSHIP

BACKGROUND OF THE INVENTION

1. Field of the Invention

This invention relates to a dart-type airship with high propulsive efficiency.

2. Description of the Prior Art

The realization of an airship with high propulsive efficiency can be expected to make possible the development of high-altitude stationary platforms and airships driven by solar energy and thus to contribute to the solution of the world's environmental problems. It can also be expected to advance today's information-intensive society by expanding the capabilities of radio relay systems and remote sensing systems.

In one airship hull design for realizing high-efficiency propulsion, air flowing along the hull surface is sucked in through ducts and then blown aft as a jet. This system, known as the boundary layer control propulsion system, prevents flow separation and restores pressure at the tail, thus achieving a reduction in overall resistance. Fluid dynamic studies on the boundary layer control propulsion system conducted by Fabio R. Goldschmied of the U.S. using an airship with a dart-type tail structure consisting of a tail boom and an empennage at the aft end of the boom confirmed an increase in propulsive efficiency in wind tunnel tests. Nonetheless, the system was not adopted by the U.S. Navy's HASPA Project because it was found to be structurally impossible to realize.

In an airship with a dart-type tail structure, the propulsion fan for the suction and jetting of air and the motor for driving the fan have to be installed in the tail section. Moreover, the empennage has to be positioned even further aft via a boom. Since this makes the aft of the hull extremely heavy, it becomes difficult to realize a viable airship structure.

SUMMARY OF THE INVENTION

This invention was accomplished in the light of the foregoing circumstances and has as its object to provide an airship which achieves high propulsive efficiency by application of the boundary layer control propulsion system.

For achieving this object, the invention provides an airship which comprises a gas envelope filled with a buoyant gas, a duct equipped with an internal propulsion fan and attached to the aft of the gas envelope, a boom projecting aft along an extension of the axis of the propulsion fan and an empennage provided on the distal end of the boom and is constituted to prevent boundary layer separation by causing the propulsion fan to suck air flowing along the hull surface into the duct and jet it aft, the duct attached to the aft of the gas bag being formed of a basket-like framework made of rigid lightweight material and covered with taut fabric material, the boom and empennage being formed of airtight fabric material and rigidified by internal pressure, and the internal pressure of the boom and the empennage being regulated to ensure that when a load force received from the empennage side exceeds a prescribed value above which some part of the airship becomes liable to be damaged the boom bends and/or the empennage deforms to relieve the load force before the damage occurs and the original shape and rigidity is thereafter restored.

Although the basket-like framework of the duct and the pressurized fabric structure of the empennage and boom are advantageous for weight reduction, the basket-like framework located at the fore end of the boom sustains maximum bending moment when a load force is received from the empennage side. The only way that the bending strength can be increased to cope with this bending moment is by reinforcing the beams constituting the framework. As this runs counter to the desire to reduce weight, in this invention the internal pressures of the boom and the empennage are adjusted such that the boom bends and/or the empennage deforms when the load forces received from the empennage side exceed prescribed values. Since this bending and/or deformation reduce the load forces transmitted from the empennage side, reinforcement of the beams is not required. Once the load forces have subsided under the prescribed values, the boom and/or the empennage are restored to their original shapes and rigidity.

Damage to the duct can thus be prevented by adjusting the internal pressure so as to regulate the rigidity of the pressurized fabric structure of the boom and empennage to levels that enable the boom to bend and the empennage to deform before a large force acting on the duct can cause any damage. What is more, the boom is also completely safe from damage.

Since this invention enables an airship with a dart-type tail structure to be protected from damage by load force received from the empennage side while simultaneously enabling a substantial weight reduction, it makes it possible to achieve high propulsive efficiency in an airship with a dart-type tail structure.

The above and other features of the present invention will become apparent from the following description made with reference to the drawings.

DESCRIPTION OF THE PREFERRED EMBODIMENT

Figure 1:
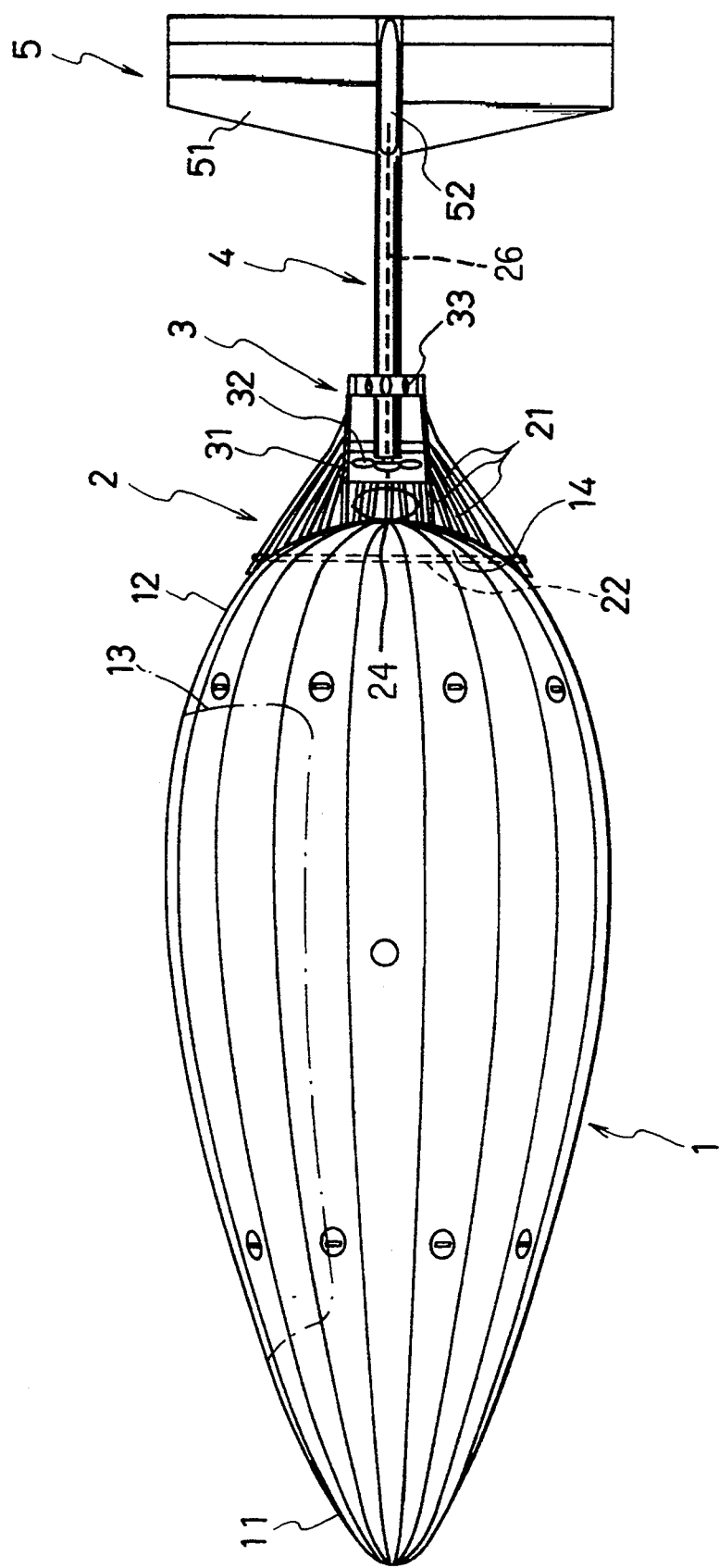
FIG. 1 is a schematic view, partially in section, for explaining an embodiment of the airship of this invention.
Figure 2:
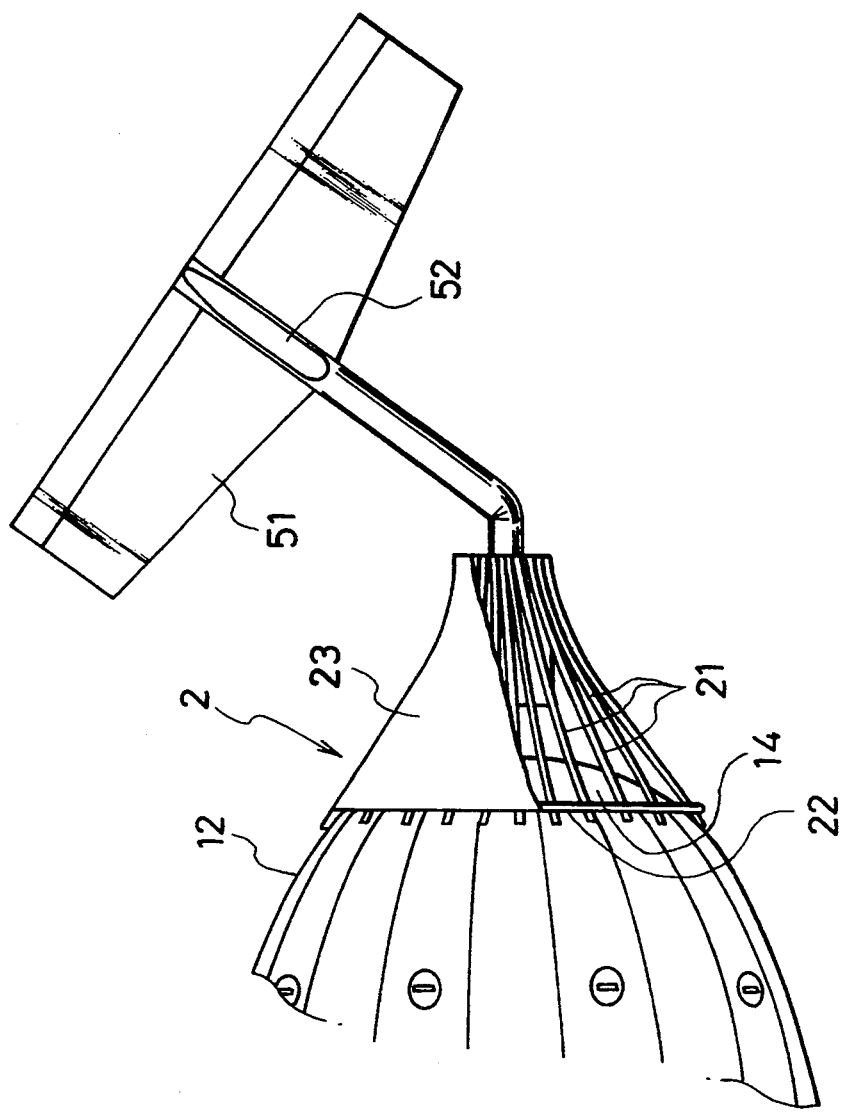
FIG. 2 is a partial view of the airship of FIG. 1 showing the boom in the bent state.

The airship according to this invention will now be explained with reference to an embodiment thereof shown in the drawings. As shown in FIG. 1, the airship is constituted mainly of a gas envelope 1 for producing lift, a duct 2 attached to the aft of the gas envelope 1 and equipped with an internal propulsion fan 3, a boom 4 projecting aft along an extension of the axis of the propulsion fan 3 and an empennage 5 provided on the distal end of the boom 4 for maintaining flight stability and controlling the airship attitude.

The gas envelope 1 is of the nonrigid type. It is constituted of tough fabric and filled with a pressurized buoyant gas (helium) which maintains the hull rigidity. So as to maintain the laminar flow as far back from the nose 11 as possible and thus to shift the boundary layer separation point as far toward the aft 12 as possible, the nose 11 is made pointed and the maximum diameter section is positioned as far to the rear as possible without producing excessive pressure resistance.

A solar battery panel 13 consisting of an array of numerous solar cells (not shown) is attached to cover a surface region of the gas envelope 1. The electric power produced by the solar cells is used to drive the duct fan etc. explained later for propelling the airship.

The duct 2 is attached to the aft 12 of the gas envelope 1 with its axis aligned with the axis of the gas envelope 1 and so as to define between itself and the surface of the gas envelope 1 an annular opening 14 constituting an air intake slot. The duct 2 comprises a basket-like framework consisting of beams 21 and a forward ring 22, all of which are made of a rigid light-weight material such as carbon fiber reinforced plastic. At one end the beams 21 are connected to the aft 12 of the gas envelope 1 and at the other they are attached to a cylindrical housing 31 of the propulsion fan 3 so as to support the propulsion fan 3. The forward ring 22 is attached to the beams 21 at a position near the aft 12 of the gas envelope 1 for defining the annular opening 14. The duct 2 is completed by covering the beams 21 and the ring 22 with a taut fabric material 23.

The framework formed of the rigid light-weight beams 21 and the ring 22 constitute a light-weight structure for bearing external forces. Moreover the duct constituted by attaching the taut light-weight fabric material 23 over the surface of the framework is, as a whole, very light in weight. As such, it effectively reduces the weight of the airship tail section.

The propulsion fan 3 supported by the basket-like framework via the housing 31 is constituted of a motor-driven axial fan 32 provided in the housing 31 and guide vanes 33 provided at the aft outlet of the housing 31 for straightening the slip stream of the axial fan 32. The propulsion fan 3 sucks in the boundary flow on the surface of the gas envelope 1 through the annular opening 14 at the forward end of the duct 2, thus suppressing boundary separation and greatly reducing the resistance acting on the hull, and at the same time serves to propel the airship by jetting the air aft.

The boom 4 is attached so as to project aft along an extension of the axis of the propulsion fan 3 and is provided at its distal end with the empennage 5, which consists of a vertical tail wing 51 and a horizontal tail wing 52 arranged in a cruciform. By receiving the fan slip stream etc. and controlling the airship attitude, the empennage 5 enhances the overall airship stability and maneuverability. The boom 4 and the empennage 5 are formed as hollow bodies from a fiber reinforced airtight fabric material such as aramide fiber fabric coated with polyurethane. They are inherently nonrigid structures imparted with rigidity by internal gas pressure.

The empennage 5 can alternatively be constituted by, for example, using pressure tube ribs to link radially disposed pressure tube spars and covering this framework with a reinforced fabric.

Although not illustrated, as in the empennages of conventional airships, the vertical tail wing 51 and the horizontal tail wing 52 are constituted so as to be wholly or partially tiltable for controlling the attitude and the direction of propulsion of the airship.

For imparting internal pressure to the boom 4 and the empennage 5, an air compressor 24 is installed at an appropriate location on the hull for supplying pressurized air to the interior of the boom 4 and the empennage 5 via pipes 26. For suppressing leakage and heat induced pressure fluctuations in the boom 4 and empennage 5, the boom 4 and the empennage 5 are equipped with pressure regulators (not shown) and are supplied with compressed air so as to maintain their internal pressure constant at all times. Moreover the boom 4 and the empennage 5 are able to withstand up to a specific load level owing to their internal pressure and the tensile strength of the fabric material.

The basket-like structure of the duct 2 and the pressurized fabric structure of the boom and empennage are highly effective in reducing the weight of the tail section, especially in conjunction with recent advances in the development of high-strength, light-weight materials and high-strength fabrics.

In the aforesaid airship structure, the basket-like framework of the duct 2 is situated at the root of the boom 4, where it is subjected to maximum bending moment when wind or some other external force acts on the empennage 5. Any attempt to increase the strength of the framework of the duct 2 to cope with this bending moment would have to involve increasing the strength (and weight) of the beams 21 of the duct 2 to enable them to bear up under the bending and twisting forces received from the empennage 5. In this invention, therefore, for reducing the amount of force that the basket-like framework has to withstand, the internal pressure of the pressurized fabric structure boom 4 is controlled so that the boom 4 bends when the load force received from the empennage side exceeds a prescribed value, thus reducing the load force transmitted to the duct 2. When the load force once again falls below the prescribed value, the boom 4 is restored to its original shape and rigidity. In addition, it is also possible to regulate the internal pressure of the pressurized fabric structure empennage 5 so that when the load force on the empennage exceeds a prescribed value the empennage 5 will deform to reduce the load force transmitted to the duct 2.

It thus becomes possible to protect the duct 2 from damage by using internal pressure to regulate the rigidity and strength of the boom 4 and/or the empennage 5 so that the boom 4 bends or the empennage 5 deforms before the duct 2 can be broken by a large force acting thereon. Moreover, the boom 4 and the empennage 5 are restored to their original state once the load force has subsided, without suffering any damage. Since the airship is maintained aloft by the lift produced by the gas envelope 1, the transient bending of the boom 4 or deformation of the empennage 5 does not present any great danger, even though it may cause a partial and temporary disablement of the control capability.

For applying the boundary layer control propulsion system to a dart-type airship having a tail boom supporting an empennage at the aft end it is necessary to greatly reduce the weight of the tail section. The airship according to this invention achieves this weight reduction by use of a duct of framework structure and a boom and an empennage of fabric structure. What is more, the invention provides an airship with high propulsive efficiency which further features the ability to avoid damage when subjected to a large load force either during flight or on the ground and to resume its original shape once the force has subsided.

What is claimed is:

1. An airship for preventing boundary layer separation by causing a propulsion fan to suck air flowing along the hull surface and jetting it aft, the airship comprising a gas envelope filled with a buoyant gas,
a duct equipped with an internal propulsion fan and attached to the aft of the gas bag wherein the air flowing along the hull surface is sucked into the duct, the duct including a basket-like framework made of rigid light-weight material and covered with taut fabric material, a boom projecting aft of said gas bag along an extension of the axis of the propulsion fan, the boom being formed of airtight fabric material and rigidified by a first internal pressure thereof, and an empennage provided on the distal end of the boom wherein the empennage comprises an airtight fabric material which is rigidified by a second internal pressure thereof, an air compressor for regulating each of first and second internal pressures of the boom and the empennage, respectively so that when load forces received from an empennage side of said boom exceed prescribed values, one of boom bending and empennage deforming occurs to relieve the load forces and allow the boom and the empennage to resume an original shape and rigidity thereof prior to the load forces being received from the empennage side of the boom.

* * * * *